(12) United States Patent
Kalafala et al.

(10) Patent No.: US 8,578,310 B2
(45) Date of Patent: Nov. 5, 2013

(54) METHOD OF MEASURING THE IMPACT OF CLOCK SKEW ON SLACK DURING A STATISTICAL STATIC TIMING ANALYSIS

(75) Inventors: Kerim Kalafala, Rhinebeck, NY (US); Natesan Venkateswaran, Hopewell Jct., NY (US); Chandramouli Visweswariah, Croton-on-Hudson, NY (US); Vladimir Zolotov, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 12/857,591

(22) Filed: Aug. 17, 2010

(65) Prior Publication Data

US 2012/0047477 A1    Feb. 23, 2012

(51) Int. Cl.
*G06F 9/455* (2006.01)
*G06F 17/50* (2006.01)

(52) U.S. Cl.
USPC ............................ 716/108; 716/106; 716/113

(58) Field of Classification Search
USPC ......................................................... 716/108
See application file for complete search history.

(56) References Cited

U.S. PATENT DOCUMENTS

2007/0022397 A1* 1/2007 Darsow et al. .................... 716/6
2008/0209372 A1* 8/2008 Buck et al. ........................ 716/6

OTHER PUBLICATIONS

Chen, Ruiming et al., "Static Timing: Back to our Roots", Mar. 21-24, 2008, Design Automation Conference, 2008. ASPDAC 2008. Asia and South Pacific, pp. 310-315.*
Statistical Clock Skew Modeling With Data Delay Variations, Harris, et al.; IEEE vol. 9, No. 6, Dec. 2001; pp. 888-898.
Statistical Clock Skew Analysis Considering Intra-Die Process Variations, Agarwal, et al; International Conference on Computer Aided Design (ICCAD'03) Nov. 11-13, 2003; pp. 914-921.

* cited by examiner

*Primary Examiner* — Nha Nguyen
*Assistant Examiner* — Bryce Aisaka
(74) *Attorney, Agent, or Firm* — H. Daniel Schnurmann

(57) ABSTRACT

Computing accurately and effectively the impact of clock skew on statistical slack in the presence of statistically variable timing quantities that accounts for both common path credit in the common portion of the clock tree, and RSS credit in the non-common of the clock tree. The clock skew is measured on a per launch and capture path-pair basis as a function of on the post-CPPR path-specific slack (including RSS credit), total mean value of latch-to-latch delay, RSS value of random latch-to-latch delay, test guard time and test adjust. The method includes: performing an initial block-based SSTA including CPPR analysis; selecting at least one launch and capture path-pair for skew analysis; for the at least one path pair, recording post CPPR slack, total mean value of latch-to-latch delay, RSS value of latch to latch delay, test guard time and test adjust; and quantifying the impact of clock skew on statistical slack thereof.

12 Claims, 1 Drawing Sheet

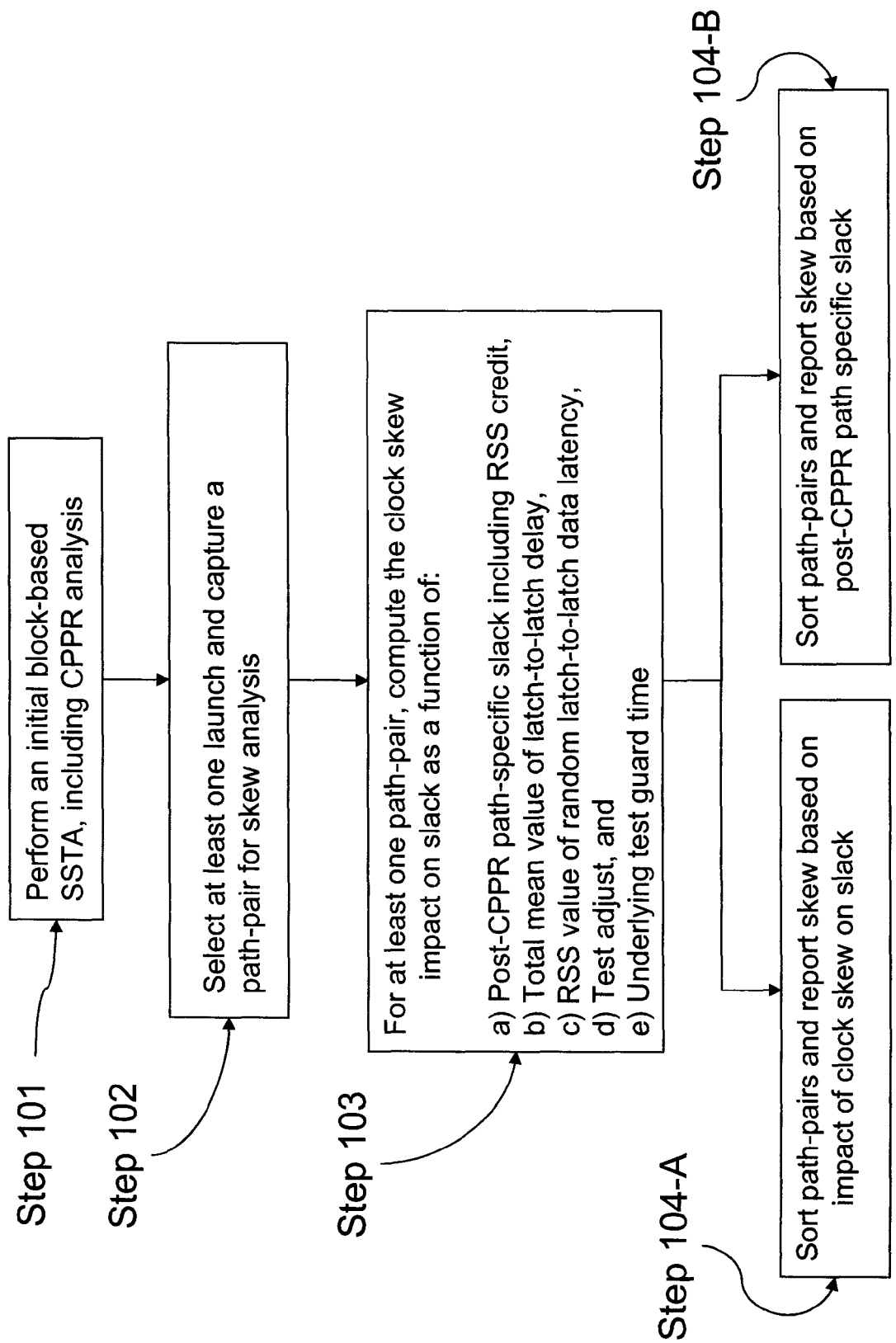

METHOD OF MEASURING THE IMPACT OF CLOCK SKEW ON SLACK DURING A STATISTICAL STATIC TIMING ANALYSIS

FIELD OF THE INVENTION

The present invention generally relates to the field of Design Automation of semiconductor VLSI chips, and more particularly, to a system and method for accurate measuring the impact of clock skew on slack when performing a statistical static timing analysis.

BACKGROUND

A goal of a statistical static timing analysis (SSTA) is to determine the latest and earliest possible switching time distributions of various signals within a digital circuit. SSTA may generally be performed at the transistor level or at the gate level, using pre-characterized library elements including those at higher levels of abstraction for complex hierarchical chips.

SSTA algorithms operate by first levelizing the logic structure, and breaking any loops in order to create a directed acyclic graph (timing graph). Modern designs can often contain millions of placeable objects, with corresponding timing graphs having millions, if not tens of millions of nodes. For each node, a corresponding arrival time (AT), transition rate (slew), and required arrival time (RAT) are computed for both rising and falling transitions as well early and late mode analysis. Each such value may be represented in general as a distribution, for instance, using a first-order canonical form, wherein timing quantities are represented as functions of underlying sources of variation, as described in U.S. Pat. No. 7,428,716 to Visweswariah. An arrival time (AT) distribution represents the latest or earliest time at which a signal can transition due to the entire upstream fan-in cone. The slew distribution represents the transition rate associated with a corresponding AT, and a required arrival time (RAT) distribution represents the latest or earliest time at which a signal must transition due to timing constraints in the entire downstream fan-out cone.

ATs are propagated forward in a levelized manner, starting from the design primary input asserted (i.e., user-specified) arrival times, and ending at either primary output ports or intermediate storage elements. For single fan-in cases, AT sink node=AT source node+delay from source to sink.

Whenever multiple signals merge, each fan-in contributes a potential arrival time computed as AT sink (potential)=AT source+delay, making it possible for the maximum (late mode) or minimum (early mode) of all potential arrival times to be statistically computed at the sink node. Typically, an exact delay function for an edge in a timing graph is not known, but instead only a range of possible delay functions can be determined between some minimum delay and maximum delay. In this case, maximum delay functions are used to compute late mode arrival times and minimum delay functions are used to compute early mode arrival times.

RATs are computed in a backward levelized manner starting from either asserted required arrival times at the design primary output pins, or from tests (e.g., setup or hold constraints) at internal storage devices. For single fan-out cases, RAT source node=RAT sink node−delay.

When multiple fan-outs merge (or when a test is present), each fan-out (or test) contributes a prospective RAT, enabling the minimum (late mode) or maximum (early mode) required arrival time to be computed statistically at the source node. When only a range of possible delay functions can be determined, a maximum delay function is used to compute late mode required arrival times and a minimum delay function is used to compute early mode required arrival time.

The difference between the arrival time and required arrival time at a node (i.e., RAT−AT in late mode, and AT−RAT in early mode) is referred to as slack. A positive slack implies that the current arrival time at a given node meets all downstream timing constraints, and a negative slack implies that the arrival time fails at least one such downstream timing constraint. A timing point may include multiple such AT, RAT, and slew values, each denoted with a separate tag, in order to represent data associated with different clock domains (i.e., launched by different clock signals), or for the purpose of distinguishing information for a specific subset of an entire fan-in cone or fan-out cone.

Clock skew generally refers to the difference between ideal and actual arrival times at a clock inputs. In the case of a setup test, for example, a data signal may launch slightly later than the ideal clock reference time, and/or the capture clock signal may arrive slightly earlier than the ideal clock reference. In such a circumstance, these differences between actual and ideal clock arrival times (clock skew) will rob from the effective cycle time available for a signal to propagate on a given latch to latch path. Similarly, for a hold test, the case where launching latch clock arrival time arrives earlier than ideal and/or capture latch clock arrives later than ideal can force the need for additional padding on a given latch-to-latch path so as to avoid an early mode race condition.

It is therefore desirable during SSTA to diagnose the impact on the slack of a failing path due to clock skew. This information can then be used by a designer to determine whether additional skew optimization in the clock tree will be useful to close on SSTA, and to determine how to best tune the clock tree arrival time functions in order to minimize clock skew impacts on the slack.

During a SSTA, several factors make it difficult to compute the impact of the clock skew on a downstream slack. First, the test in question may receive a common path pessimism removal (CPPR) credit (i.e., an adjustment to test the slack in order to recover excess pessimism) for the physically common portion of the launch and capture paths in question. A proper analysis of clock skew therefore needs to factor out the portion of the capture/launch clock arrival time difference which is credited during CPPR analysis. Second, due to statistical root-sum-square (RSS) treatment of independently random delay along a path, the analysis of a complete launching and capture path pair is required in order to determine by how much the random delay specific to the non-common clock tree impacts downstream slack. Finally, in order to improve the turn-around-time efficiency, for diagnostic purposes, it is desirable to maintain clock skew measurements in-situ, i.e., within steps comprising existing SSTA sign-off flows.

Conventional techniques for computing the clock skew impact on slack fail to account properly for either CPPR credit in the common clock portion, or for the impact of RSS credit in the unique portion of a given launching and capturing path-pair, the latter being referred as the pair of launching and capturing paths meeting at a test. One such prior art technique (hereinafter referred to as "prior art technique #1") simply involves computing clock skew impact on slack as the early versus the late arrival time difference among the launch and capture clock arrival times. This method implicitly assumes zero CPPR credit for the common clock tree and zero RSS credit for the random delay along the non-common clock tree. Therefore, generally, it produces a pessimistic bound on the clock skew impact on the slack.

Another technique (hereinafter referred to as "prior art technique #2) computes the clock skew impact on slack as the late vs. late (or early vs. early) arrival time difference among launch and capture clock arrival times. The method implicitly assumes full CPPR credit among launch and capture clocks, and therefore produces an optimistic bound on the actual impact of clock skew on the slack.

An example of the shortcomings of prior art techniques can be illustrated by considering a scenario where all random delays are zero (note that even though random delay is zero, early and late mean delays may still be different for the same circuit elements due to factors such as simultaneous switching, IR drop effects, coupling, or other systematic sources of variation).

Prior art technique #1 computes the clock skew impact on setup test slack as simply the early vs. late difference in launch and capture clock arrival times, namely, $DE_{COMMON}$=Common clock early delay
$DL_{COMMON}$=Common clock late delay
$DE_{CAPTURE}$=Unique clock capture path mean early delay
$DL_{LAUNCH}$=Unique clock launch path mean late delay Clock skew impact on slack (prior art technique #1)=EARLY_AT$_{CAPTURE}$−LATE_AT$_{LAUNCH}$= ($DE_{COMMON}$+$DE_{CAPTURE}$)−($DL_{COMMON}$−$DL_{LAUNCH}$)=($DE_{COMMON}$−$DL_{COMMON}$)+($DE_{CAPTURE}$−$DL_{LAUNCH}$)

Prior art technique #1 produces a pessimistic estimate for clock skew impact on slack by including the early vs. late difference in the common portion of the clock tree (for which CPPR should provide credit to the actual measured test slack).

Prior art technique #2 computes the clock skew impact on setup test slack as the difference between late vs. late capture/launch arrival times, i.e., Clock skew impact on slack (prior art technique #2)=LATE_AT$_{CAPTURE}$−LATE_AT$_{LAUNCH}$=($DL_{COMMON}$+$DL_{CAPTURE}$)−($DL_{COMMON}$−$DL_{CAPTURE}$)=($DL_{LAUNCH}$−$DL_{CAPTURE}$)

The aforementioned approach produces an optimistic estimate of clock skew impact on slack by ignoring variation effects (i.e., early vs. late delay differences) within the non-common portion of the clock tree. A practitioner skilled in the art will realize that an optimistic result would also be obtained by comparing early vs. early arrival times in a similar fashion.

Another example of the shortcomings of prior art techniques can be illustrated by considering an example wherein delay includes only an independently random component.

Applying "prior art technique #1" produces the following result for clock skew impact on setup test slack:

$RE_{COMMON}$=Common clock early random delay
$RL_{COMMON}$=Common clock late random delay
$RE_{CAPTURE}$=Unique clock capture path early random delay
$RL_{LAUNCH}$=Unique clock launch path late random delay Clock skew impact on slack (prior art technique #1)=EARLY_AT$_{CAPTURE}$−LATE_AT$_{LAUNCH}$= ($RE_{COMMON}$+$RE_{CAPTURE}$)−($RL_{COMMON}$−$RL_{LAUNCH}$)=($RE_{COMMON}$−$RL_{COMMON}$)+($RE_{CAPTURE}$−$RL_{LAUNCH}$)

The aforementioned method again produces a pessimistic estimate for clock skew impact on slack by failing to include CPPR credit for the common clock path, and also failing to include RSS credit when additional random delay is present in the latch-to-latch data path.

Applying "prior art technique #2" produces the following estimate for clock skew impact on setup test slack:

Clock skew impact on slack (prior art technique #2)=LATE_AT$_{CAPTURE}$−LATE_AT$_{LAUNCH}$=($RL_{COMMON}$+$RL_{CAPTURE}$)−($RL_{COMMON}$−$RL_{CAPTURE}$)=($RL_{LAUNCH}$−$RL_{CAPTURE}$)

The above approach produces an incorrect result because it fails to account for early vs. late random delay differences in the non-common clock paths, and furthermore, it fails to account for RSS credit when additional random delay is present in the latch-to-latch data path. As one skilled in the art will readily observe, an incorrect result would also be obtained by comparing early vs. early arrival times in a similar fashion.

In order to address the statistical aspect of clock skew impact on slack, other prior art approaches to the aforementioned problem are described, for instance, in the paper entitled "Statistical Clock Skew Modeling with Data Delay Variations" to Harris and Naffziger et al., published in the IEEE Transactions on Very Large Scale Integration (VLSI) Systems, December 2001, in which a method for measuring clock skew is set forth wherein a Monte Carlo analysis is performed in order to simulate impact of skew on circuit performance across a wide range of process parameter settings. However, such approaches are very time consuming due to the need to perform Monte Carlo simulations, and are also not amenable to incremental re-analysis in response to design changes.

SUMMARY

In one aspect, an embodiment of the invention provides a system and a method of computing accurately and effectively the clock skew in the presence of statistically variable timing quantities that accounts for both common path credits in the common portion of a clock tree, and the RSS credit in the non-common of the clock tree.

In another aspect, an embodiment of the invention measures the clock skew as a function of post-CPPR slack, total a mean value of latch-to-latch delay, RSS value of latch to latch delay, test guard time (i.e., setup or hold time of the test in question), and cycle adjust (i.e., as per prior art STA techniques defined as the adjust required to determine a worst case alignment of edges taking in to account possible combinations of launch and capture waveforms). Thus, when performing the statistical timing analysis, the present approach produces a significantly more accurate measurement of the clock skew.

In yet another aspect, an embodiment of the invention measures the aforementioned post-CPPR slack, total mean value of latch-to-latch delay, RSS value of latch to latch delay, test guard time, and test adjust, in-situ during a CPPR analysis and records critical paths as a function of clock skew impact on the slack.

In a further aspect, an embodiment of the invention provides a system and a method for computing clock skew impact on slack in the presence of statistical sources of variation that includes; a) performing an initial block-based SSTA analysis; b) selecting at least one launch and capture path-pair for skew analysis; c) for the at least one path pair, recording post CPPR slack (including RSS credit), total mean value of latch-to-latch delay, and RSS value of latch to latch delay, guard time and test adjust; and d) calculating and recording the impact of clock skew on statistical slack using aforementioned timing quantities.

BRIEF DESCRIPTION OF THE DRAWINGS

The accompanying drawing, which is incorporated in and which constitutes part of the specification, illustrates an embodiment of the invention which, together with the general description given above and the detailed description of the preferred embodiments given below serves to explain the principles of the invention.

FIG. 1 shows a flowchart, in accordance with an embodiment of the present invention, in which an initial block-based SSTA analysis is performed, including CPPR analysis followed by a selection of at least one launch and capture of a path-pair for skew analysis. This is followed by for at least one path-pair, computing the clock skew impact on slack as a function of: a) computing a post-CPPR path-specific slack (including RSS credit), b) total mean value of latch-to-latch delay, c) RSS value of random latch-to-latch delay latency, d) test adjust and e) underlying test guard time; and followed by computing and recording the impact of clock skew on the statistical slack using the aforementioned timing values.

DETAILED DESCRIPTION

The present invention and various features, aspects and advantages thereof are explained more fully with reference to the non-limiting embodiments that are illustrated in the accompanying drawing and detailed in the following description.

Referring to FIG. 1, Step 101 starts with conducting an initial block-based SSTA analysis. The initial propagation can include multiple sources of variation, including globally correlated and independently random components. At the conclusion of the initial block-based SSTA, the resulting test slacks may display an undue pessimism caused by a combination of: i) early vs. late delay differences which are modeled in the physically common portion of the launch and capture the clock tree feeding a given test, and ii) a random delay along the non-common launch, capturing paths that requires further RSS credit. In order to recover this pessimism, a CPPR analysis is generally performed on selected critical path-pairs which lead to failing tests.

In Step 102, launch and capture paths-pairs are selected for subsequent clock skew analysis. In one embodiment, paths are selected for skew analysis based on a slack cutoff value. In another embodiment, paths are selected for skew analysis based on statistical criticality.

In Step 103, one or more path-pairs are selected for skew analysis. The clock skew impact on slack is then computed as a function of the post-CPPR slack (including RSS credit), mean latch-to-latch delay, RSS value of the latch-to-latch random delay, test guard time, and test adjust are stored for subsequent clock skew analysis and reported. This is followed by having the aforementioned post-CPPR slack (including RSS credit), mean latch-to-latch delay, RSS value of the latch-to-latch random delay, test guard time, and test adjust stored preferably during the initial CPPR analysis (Step 101), and subsequently recalled for the analysis of the clock skew impact on slack. The computation of the impact of the clock skew on the slack can be obtained directly from the CPPR analysis step with the results saved and made available for subsequent use.

To further elaborate on Step 103, the clock skew impact on the statistical slack is determined by calculating the difference between the actual post CPPR slack and the ideal slack that would be computed if all the clock arrival times were identical. The following derivation can be used and reduced to a computation involving post-CPPR path-specific slack, total mean value of latch-to-latch delay, RSS value of random latch-to-latch delay, test guard time and test adjust.

As a first step in the derivation of clock skew impact on the statistical slack, the following indicates the post-CPPR setup slack for a generalized non-limiting exemplary capture and launch path-pair, fully accounting for both the CPPR credit in the common portion of the clock tree as well as the RSS credit for the non-common clock and data path-pair.

$DE_{CAPTURE}$=Unique clock capture path mean early delay
$DL_{LAUNCH}$=Unique clock launch path mean late delay
$DL_{DATA}$=Latch to latch data path mean late delay
$RE_{CAPTURE,I}$=Unique clock capture path early random delay (one stage of logic)
$RL_{LAUNCH,J}$=Unique clock launch path late random delay (one stage of logic)
$RL_{DATA,K}$ Data path random delay (one stage of logic)
$T_{SETUP}$ Setup time at test
DTA=Cycle adjust $$\text{Post } CPPR \text{ slack} = (DE_{CAPTURE} - DL_{LAUNCH} - DL_{DATA}) - \sqrt{\sum_{I,J,K} (RE_{CAPTURE,I}^2 + RL_{LAUNCH,J}^2 + RL_{DATA,K}^2)} - T_{SETUP} + DTA$$

Next, the following illustrates a zero skew slack, i.e., the value that would be measured if the launch and capture clock arrival times were identical.

$$\text{Zero skew slack} = -DL_{DATA} - \sqrt{\sum_{K} RL_{DATA,K}^2} - T_{SETUP} + DTA$$

To achieve the final result, the impact of clock skew on statistical slack is computed as the statistical difference between actual measured slack and the zero skew slack, i.e., Impact of clock skew on statistical slack =

$$\text{Post } CPPR \text{ slack} - \text{Zero skew slack} = (DE_{CAPTURE} - DL_{LAUNCH}) - \sqrt{\sum_{I,J,K} (RE_{CAPTURE,I}^2 + RL_{LAUNCH,J}^2 + RL_{DATA,K}^2)} + \sqrt{\sum_{K} RL_{DATA,K}^2} =$$

$$\text{Post } CPPR \text{ slack} + DL_{DATA} + T_{SETUP} - DTA + \sqrt{\sum_{K} RL_{DATA,K}^2}$$

In order to illustrate some of advantages of the present invention, the following derivation demonstratively illustrates a measurement of clock skew impact for a non-limiting exemplary setup test when random delays terms are set to zero, which has been found to produce a significantly more accurate result when compared to prior art methods, specifically in two regards: 1) it is properly recognized that only non-common clock latency affects downstream measured slack, and 2) early vs. late mean delay differences along the non-common clock path are properly accounted for.

Post CPPR slack=$DE_{CAPTURE}$−$DL_{LAUNCH}$−$DL_{DATA}$−$T_{SETUP}$+DTA

Impact of clock skew on statistical slack=Post CPPR
slack+$DL_{DATA}$+$T_{SETUP}$−DTA=$DE_{CAPTURE}$−$DL_{LAUNCH}$ Another illustration of advantages of the present invention is shown considering a second non-limiting exemplary setup test in which delays consist of only independently random components.

Post CPPR measured slack =

$$-\sqrt{\sum_{I,J,K}(RE^2_{CAPTURE,I}+RL^2_{LAUNCH,J}+RL^2_{DATA,K})}-T_{SETUP}+DTA$$

Impact of clock skew on statistical slack =

Post CPPR slack + $T_{SETUP}$ − DTA + $\sqrt{\sum_k RL^2_{DATA,K}}$ =

$$-\sqrt{\sum_{I,J,K}(RE^2_{CAPTURE,I}+RL^2_{LAUNCH,J}+RL^2_{DATA,K})}+\sqrt{\sum_k RL^2_{DATA,K}}$$

Still referring to the flowchart in FIG. 1, in Step 104-A, according to one embodiment, path-pairs are sorted based on the impact of clock skew to slack, and subsequently recorded. Such recording is envisioned to include both the post CPPR slack including RSS credit, and the clock skew impact on the slack.

In Step 104-B, path-pairs are sorted based on the post-CPPR slack, preferably followed by recording the path information such as the post CPPR slack and the impact of clock skew on the slack.

Finally, the present invention can be realized in hardware, software, or a combination of hardware and software. The present invention can be realized in a centralized fashion in one computer system or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

While the present invention has been particularly described in conjunction of a simple illustrative embodiment, it is to be understood that one of ordinary skill in the art can extend and apply this invention in many obvious ways. In the embodiments described herein, for purposes of clarity, rising and falling timing quantities were not differentiated, but one of ordinary skill in the art could apply the present invention to a situation with different rising and falling delays, slews, ATs and RATs. The invention applies to any type of statistical static timing, including but not limited to timing of gate-level circuits, transistor-level circuits, hierarchical circuits, circuits with combinational logic, circuits with sequential logic, timing in the presence of coupling noise, timing in the presence of multiple-input switching, timing in the presence of arbitrary timing tests such as setup, hold, end-of-cycle, pulse width, clock gating and loop-cut tests, and timing in the presence of multiple clock domains. It is also evident that many alternatives, modifications and variations will be apparent to those skilled in the art in light of the present description. It is therefore contemplated that the appended claims will embrace any such alternatives, modifications and variations as falling within the true scope and spirit of the present invention.

What is claimed is:

1. A method for computing a difference between a measured slack and a zero clock skew slack in presence of statistical sources of variation, comprising:
    a) using a computer for performing an initial statistical static timing analysis (SSTA), including a common path pessimism removal (CPPR) analysis;
    b) selecting from said SST analysis at least one launching and capturing at least one path-pair for skew analysis; and
    c) said skew analysis including calculating said difference between said measured slack and said zero clock skew slack by algebraically adding a post CPPR slack, a total mean latch-to-latch delay, a statistical sum of a latch-to-latch random delay, and a test guard time, and subtracting from said algebraic sum a test adjust value.

2. The method recited in claim 1 further comprising recording said post CPPR slack, said total mean value of latch-to-latch delay, said statistical RSS value of latch to latch delay, said test guard time, and said test adjust occurring during said CPPR analysis.

3. The method recited in claim 2, wherein determining the impact of said clock skew on said statistical slack is performed during said CPPR analysis.

4. The method as recited in claim 3, wherein said performing is executed within existing SSTA sign-off flows, facilitating an incremental re-analysis in response to design changes.

5. The method recited in claim 1, wherein said selected at least one launching and capturing paths pairs are sorted and recorded based on said clock skew impact on downstream slack.

6. The method recited in claim 1, wherein said path-pairs are sorted and recorded based on statistical criticality.

7. The method as recited in claim 6, wherein said recorded path-pairs include both said post CPPR slack including RSS credit, and said clock skew impact on the slack.

8. The method recited in claim 1, further comprises applying to path-pairs gate-level timing, transistor-level timing, hierarchical timing, abstracted timing, timing analysis comprising multiple clock domains, timing analysis comprising phase locked loops , and any combination thereof.

9. The method recited in claim 1, further applying to path-pairs leading to any test type consisting of: hold, clock gating, pulse width, clock overlap, and end of cycle.

10. The method as recited in claim 1, further comprising recording said impact of said clock skew on said statistical slack using predetermined timing quantities.

11. A system for computing an exact formulation of clock skew impact on slack in presence of statistical sources of variation, comprising:
    a) using a computer for performing an initial statistical static timing analysis (SSTA) including common path pessimism removal (CPPR) analysis;
    b) selecting from said SST analysis at least one launch and capturing at least one path-pair for skew analysis; and c) said skew analysis including computing said exact formulation of said impact of said clock skew contribution to test a slack by algebraically adding a post CPPR slack a total mean latch-to-latch delay, a root-sum square of independently random latch-to-latch delay, and a test guard time, and subtracting from said algebraic sum a test adjust value.

12. A non-transitory program storage device readable by a machine, tangibly embodying a program of instructions executable by the machine to compute an exact formulation of a clock skew impact on slack in presence of statistical sources of variation, comprising:

a) using a computer for performing an initial statistical static timing analysis (SSTA), including common path pessimism removal (CPPR) analysis;

b) selecting from said SST analysis at least one launch and capturing at least one path-pair for skew analysis; and c) said skew analysis including calculating said exact formulation of said impact of said clock skew contribution to test a slack by algebraically adding a post CPPR slack, a total mean latch-to-latch delay, a root-sum square of independently random latch-to-latch delay, and a test guard time, and subtracting from said algebraic sum a test adjust value.

* * * * *